C. R. CLARK.
VEHICLE WIND SHIELD.
APPLICATION FILED JUNE 12, 1913.

1,265,176.

Patented May 7, 1918.
2 SHEETS—SHEET 1.

WITNESSES:
J. Clyde Ripley
Philip S. McLean.

INVENTOR
Charles R. Clark,
BY
ATTORNEY

C. R. CLARK.
VEHICLE WIND SHIELD.
APPLICATION FILED JUNE 12, 1913.

1,265,176.

Patented May 7, 1918.
2 SHEETS—SHEET 2.

WITNESSES:
J. Clyde Ripley
Philip S. McLean.

INVENTOR
Charles R. Clark,
BY
ATTORNEY

UNITED STATES PATENT OFFICE.

CHARLES RACKWELL CLARK, OF PLAINVILLE, CONNECTICUT.

VEHICLE WIND-SHIELD.

1,265,176.   Specification of Letters Patent.   Patented May 7, 1918.

Application filed June 12, 1913. Serial No. 773,153.

*To all whom it may concern:*

Be it known that I, CHARLES R. CLARK, a citizen of the United States of America, and residing at Plainville, in the county of Hartford and State of Connecticut, have invented new and useful Improvements in Vehicle Wind-Shields, of which the following is a specification.

My invention relates particularly to an individual wind shield for the rear seat of an automobile and the like.

On account of the small space available it has been found difficult to provide a suitable means for shielding the passengers on the rear seat. It is my object to provide a simple and reliable shield which can be readily installed in any car and adapted to fit the requirements for any person and adjustable to substantially any position necessary for proper protection.

In its preferred form the invention consists of a shield supported from the seat between the seat cushions and the arm cushions. A standard for the shield is adjustable angularly and the shield proper is rotatable. The shield proper is of strong transparent material such as glass which may be reinforced with wire mesh to strengthen it and also to prevent the flying of particles in case of fracture.

Figure 3:
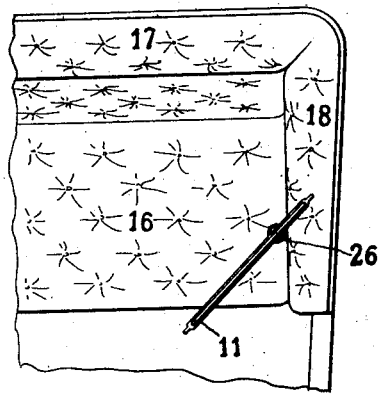
Fig. 3, is a fragmentary view showing a single shield in position.
Figure 4:
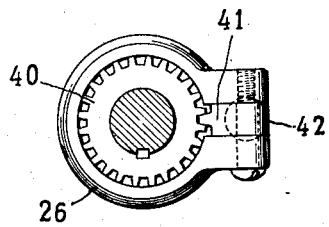
Fig. 4, is a horizontal section and plan view showing the adjustable rotary connection between the shield and its standard.
Figure 1:
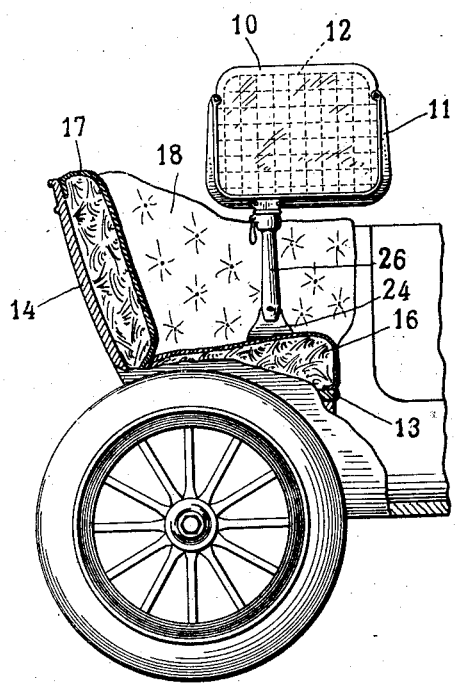
Figure 1, is a fragmentary side and sectional view of the rear of a car with a wind shield embodying the improvements of my invention.

The shield proper 10 is supported in a frame 11 and may be reinforced by wire fabric 12 embedded therein.

The seat 13 has a back 14 and a side 15 for which cushions 16, 17 and 18 respectively are provided.

The base plate 20 is secured to the seat 13 for instance by screws 21 which are screwed through the holes 22. The upper surface of the base plate is provided with a curved toothed portion 23. The arm 24 has a curved foot 25 provided with teeth meshing with the teeth of the base plate 20. The curved foot 25 is secured to the curved part of the base plate by screws such as 27 passing through holes 28 and screwed into the bar 29. I further stabilize the arm and attached wind shield by providing openings 30 in the base plate and lugs 31 on the foot of the arm. This prevents the parts from tilting and becoming disengaged or lost. The arm 24 is preferably made thin, broad and rounded on the outer surface to provide a maximum of strength in a minimum space.

Figure 2:
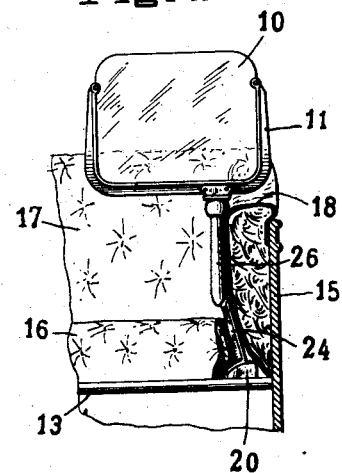
Fig. 2, is a fragmentary view looking from the front toward the rear and showing a side arm cushion in section.
Figure 5:
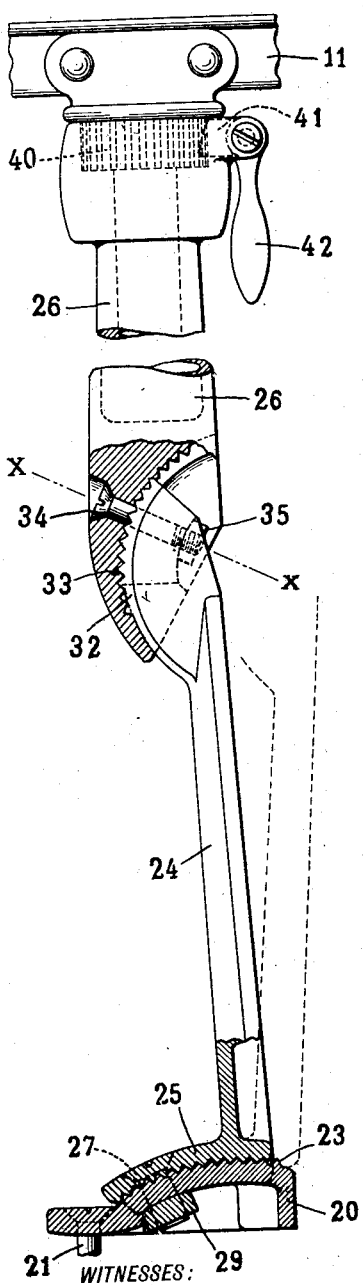
Fig. 5, is a front vertical projection of the standard, parts being shown in section.
Figure 9:
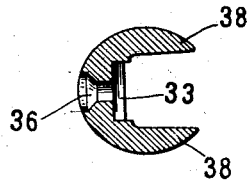
Fig. 9, is a cross sectional view on the plane of the line X, X, of Fig. 5.
Figure 7:
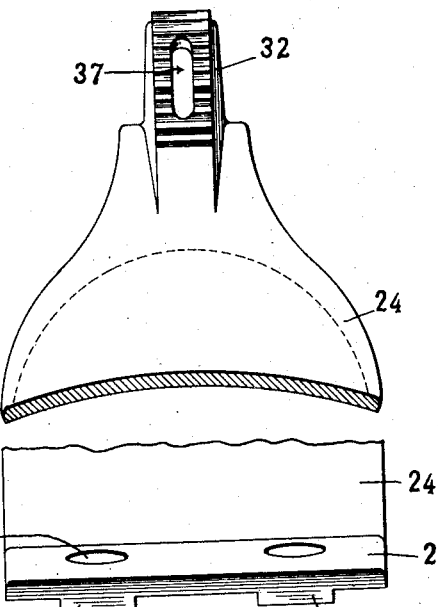
Fig. 7, is a vertical projection of the tilting arm of the standard, the central part being broken away.
Figures 6, 8:
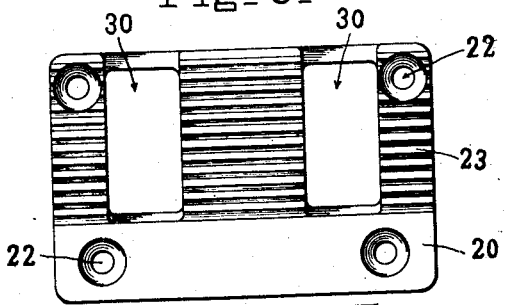
Fig. 6, is a plan view of the base plate adapted to be secured on the seat.
Fig. 8, is a plan view of a clamping bar for clamping the arm to the base plate.

The upper part 26 of the wind shield standard is secured to the upper end of the arm 24 so that it may be angularly adjusted to fit the cushions, as indicated in Fig. 2. The upper end of the arm 24 has an arcuate toothed portion 32 and the member 26 has a correspondingly shaped recess with teeth 33. The two parts are drawn together by a screw bolt 34 and a nut 35, the screw bolt passing through the hole 36 in the member 26 and through the slot 37 in the arm 24. Side flanges 38, 38 protect the parts and also prevent side play.

The upper end of the standard houses a toothed member or gear 40 secured to the main wind shield frame. The dog 41 is adapted to engage the teeth of member 40 to hold it in any angular position. The handle 42 is provided for operating the dog 41.

What I claim is:—

1. In a wind shield construction a relatively flat base plate resting upon and secured to the seat at the junction of the seat and side cushions to be thereby disposed beneath the seat cushion and having a curved portion, a standard mounted thereon and having a curved portion engaging the curved portion of the base plate and adapted to adjustment to various angles in a vertical transverse plane toward and away from the side cushions, means accessible from on top of the base plate for securing the standard in its angularly adjusted relation on the base plate, and a wind shield carried by the upper end of the standard adjustable angularly on a vertical axis.

2. In combination with an automobile seat having a yielding side cushion and a removable seat cushion, a base secured at the end of the seat beneath the seat cushion, a supporting column comprising jointed upper and lower sections, said lower section being secured to the base and extending up between the end of the seat cushion and the face of the side cushion at an angle to fit the angle of the side cushion, the upper column section being angularly adjusted with respect to the lower section to fit the face of the side cushion, and a shield member adjustably mounted on said jointed column.

3. In an automobile wind shield, the combination of a base plate, a standard projecting upwardly therefrom and having a curved upper portion, a second member having a curved lower portion fitting the curved portion of said standard and having side walls embracing the side of the curved portion of said standard, one of said curved members being slotted and a clamping member extending through said slot and through the other member for clamping the curved portion together in adjusted positions and a wind shield secured to the upper end of said second member.

4. In an automobile wind shield, the combination of a base adapted to be secured to the seat of the vehicle, a supporting standard having a foot engaging the base, the foot of the standard and the base having segmental toothed engaging surfaces whereby the standard may be adjusted angularly in respect to the base to adapt the standard to fit the cushions of the seat, means for clamping the foot of the standard to the base accessible from on top of the base and an angularly adjustable shield element mounted on the standard.

5. In an automobile wind shield, a base having a segmental supporting surface, a standard having a foot provided with a segmental surface engaging the supporting surface of the base, means securing the standard in adjusted angular relation upon the base, said standard having jointed sections provided with segmental engaging surfaces, means securing the sections of the standard in adjusted angular relation, a shield element rotatably adjustable on the standard and means securing the shield in its adjusted angular relation on the standard.

6. In an automobile wind shield, a standard having jointed upper and lower sections, the lower section having a segmental head on its upper end, the upper section having its lower end recessed to receive the segmental head with side walls inclosing the sides of the head and a segmental surface to engage the segmental head, means clamping the engaging portions of the sections in adjusted angular relation and a shield element supported on the standard.

7. In combination, a base having a toothed bearing surface arranged on a curve and slotted for the passage of a clamping screw, a standard having a foot provided with a toothed under surface curved to fit the toothed bearing surface of the base and provided with a lug engaging in the slot in the base to prevent endwise movement of the foot on the base, a clamping screw engaging the foot of the standard and passing through the slot in the base and a shield element carried by the standard.

8. In an automobile wind shield, a standard consisting of a lower section flattened to pass up between the edge of the seat cushion and the face of the side cushion and an upper section to press into the surface of the side cushion, the said sections of the standard having segmental engaging surfaces whereby said sections may be adjusted to fit the cushions, and a shield member carried by the standard.

CHAS. RACKWELL CLARK.

Witnesses:
H. M. BRACKEN,
RUTH W. RYDER.

Correction in Letters Patent No. 1,265,176.

It is hereby certified that the name of the patentee in Letters Patent No. 1,265,176, granted May 7, 1918, for an improvement in "Vehicle Wind-Shields," was erroneously written and printed "Charles Rackwell Clark," whereas said name should have been written and printed as *Charles Rockwell Clark;* and that the said Letters Patent should be read with this correction therein that the same may conform to the record of the case in the Patent Office.

Signed and sealed this 21st day of May, A. D., 1918.

[SEAL.]

R. F. WHITEHEAD,

*Acting Commissioner of Patents.*

Cl. 21—148.